United States Patent
Bird (10) Patent No.: US 9,371,077 B1
(45) Date of Patent: Jun. 21, 2016

(54) SEMI TRUCK ON A RAIL FLAT CAR HOLDING DEVICE

(71) Applicant: Stanley W. Bird, Cave Creek, AZ (US)

(72) Inventor: Stanley W. Bird, Cave Creek, AZ (US)

( * ) Notice: Subject to any disclaimer, the term of this patent is extended or adjusted under 35 U.S.C. 154(b) by 0 days.

(21) Appl. No.: 14/723,542

(22) Filed: May 28, 2015

Related U.S. Application Data (60) Provisional application No. 62/005,747, filed on May 30, 2014.

(51) Int. Cl.
*B60P 7/08* (2006.01)
*B61D 47/00* (2006.01)
*B60P 3/075* (2006.01)

(52) U.S. Cl.
CPC ............ *B61D 47/00* (2013.01); *B60P 3/075* (2013.01)

(58) Field of Classification Search
CPC .............................. B60P 3/075; B61D 47/00
USPC ............. 410/9, 10, 12, 19–22, 30, 56, 65, 67; 105/355
See application file for complete search history.

(56) References Cited

U.S. PATENT DOCUMENTS

| | | | |
|---|---|---|---|
| 2,036,212 | A | 7/1933 | Gwatkin |
| 3,568,607 | A | 3/1971 | Gutridge |
| 4,129,079 | A | 12/1978 | Shannon |
| 4,385,857 | A | 5/1983 | Willetts |
| 4,668,142 | A | 5/1987 | Fity et al. |
| 4,671,714 | A * | 6/1987 | Bennett ........................ 410/57 |
| 5,501,566 | A | 3/1996 | Engle |
| 5,795,115 | A | 8/1998 | Collins |
| 6,095,731 | A | 8/2000 | Minakami et al. |
| 6,666,148 | B1 | 12/2003 | Coslovi et al. |
| 7,513,725 | B1 * | 4/2009 | Bullock ................. B60P 3/075 410/10 |
| 8,272,818 | B2 | 9/2012 | Anderson et al. |

OTHER PUBLICATIONS

"Roadrailer", Wikipedia, printed Mar. 16, 2014, http://en.wikipedia.org/wiki/Roadrailer.
"Rolling Highway", Wikipedia printed Mar. 15, 2014 http://en.wikipedia.org/wiki/Rolling_highway.
Seigenthaler, "Truck Drivers Hit the Rails and Take a Break", published Aug. 27, 2012 http://www.swissinfo.ch/eng/swiss_news/Truck_drivers_hit_the_rails_an . . . .
Seidelmann, "40 Years of Road-Rail Combined Transport in Europe" (c) 2010 International Union of combined Road-Rail transport companies UIRR scrl, 31, rue Montoyer, B-1000 Brussels, Belgium web page: http://www.uirr.com.
Kaushik, "Vert-A-Pac: An Unusual Way to Transport Automobiles" printed Mar. 16, 2014 http://www.amusingplanet.com/2012/12/vert-pac-unusual-way-to-transpor . . . .

\* cited by examiner

*Primary Examiner* — Stephen Gordon
(74) *Attorney, Agent, or Firm* — Robert Platt Bell (57) ABSTRACT

The invention comprises an improved method and apparatus for securing a tractor-trailer or other powered vehicle to a flatbed railcar (flatcar). The vehicle is driven onto the flatcar until the powered wheels of the vehicle reach a set of rollers. The vehicle then drives these rollers (or a treadmill) which power a mechanical, hydraulic, and pneumatic system which latches the wheels of the vehicle to the flatcar.

10 Claims, 8 Drawing Sheets

SEMI TRUCK ON A RAIL FLAT CAR HOLDING DEVICE

CROSS-REFERENCE TO RELATED APPLICATIONS

The present application claims priority from Provisional U.S. Patent Application No. 62/005,747 filed on May 30, 2014, and incorporated herein by reference.

FIELD OF THE INVENTION

The present invention relates to device for securing tractor-trailers and other vehicles to a railroad car or trailer or the like. In particular, the present invention is directed toward a mechanism whereby the wheel of a tractor-trailer may be secured automatically, using the power of the rotating tractor-trailer wheels to drive the securing mechanism.

BACKGROUND OF THE INVENTION

The broad concept of the "Rolling Road" where tractor-trailer rigs drive on and off a train is well-known in Europe, albeit over limited routes. This type of piggyback service is known as a "Rolling Road", where truckers literally drive onto a specially made flatcar with smaller diameter wheels (to lower the overall height to clear tunnels). In Europe, the trailer and the truck (tractor) are loaded together, and the drivers may then retire to a passenger coach attached to the train. At the end of the journey, the tractor-trailers are driven off the flatcars and the drivers resume their journey.

Seidelmann, "40 Years of Road-Rail Combined Transport in Europe" published in 2010, summarizes various road/rail schemes in Europe. Of particular interest is chapter 5 (page 25) which describes the "Rolling Highway" concept, in which a tractor-trailer rig is driven onto a flatcar and then secured in place, while the driver rides in an accompanying passenger car. The document is silent as to how the trucks are attached to the flatcar. The comments on pages 26-28 are worth noting. The "rolling highway" concept has been successful only in some parts of Europe where special circumstances make it cost-effective. Carrying tractors, as well as trailers, increases the load weight and cost per ton of freight. On some routes, the system is economical, as it allows drivers to sleep and thus comply with rest hour regulations.

Seigenthaler, "Truck Drivers Hit the Rails and Take a Break", published Aug. 27, 2012 also describes the "Rolling Road" concept. "Rolling Highway", Wikipedia printed Mar. 15, 2014, also describes the "Rolling Road" concept. "Roadrailer", Wikipedia, printed Mar. 16, 2014, describes the system disclosed in Willetts, U.S. Pat. No. 4,385,857, issued May 31, 1983, described below.

The "rolling road" concept has met with limited success in Europe, as it is only cost-effective on certain routes. The cost of labor of loading and unloading trains at each end of the journey adds to the cost of the rolling road concept. In the United States, "Piggyback" systems have been used with some success. However, such systems are of no use to the owner/operator of a truck/trailer, as the trailer is attached to the railcar, and then picked up at the destination by another driver. A "Rolling Road" concept could allow a tractor-trailer driver to deliver goods across larger distances, saving fuel and avoiding long, tiresome drives. The time spent sleeping or relaxing on a railcar would help drivers comply with rest-hour regulations for truckers. However, in order for such a "Rolling Road" system to work, it would have to be quick and easy to use, and also low cost.

One problem with these "Rolling Road" concepts, in addition to the cost/benefit analysis, is the time needed to load a series of trucks onto a railcar, and then secure each truck to a railcar. Systems such as the "Autotrain" which is run by AMTRACK from Lorton, Va. to Sanford, Fla., requires passengers to arrive often hours before the train departs, so that cars may be inspected, driven onto train cars (by a group of professional drivers) and then individually secured into place with straps, chains, or other traditional securing mechanisms. Upon arrival at the destination, the same process is repeated, and the passenger can wait an hour or two for their car to be unstrapped, unloaded, and delivered to them for use. A need exists in the art for such auto transport systems to allow for a vehicle to be easily loaded, preferably by the driver of the vehicle, and then automatically secured. The savings in time and labor would be tremendous.

The Prior Art references cited above make no mention as to how the tractor-trailers are secured on these "rolling road" trains. There is mention that the flatcars are narrow and there is very tight clearance between the tires of the trucks and the side rails. It appears the vehicles are attached to the flatbed cars using traditional chains, straps, chocks, and other devices known in the art.

There are also various techniques for loading tractor-trailers (or at least trailers) onto railroad flatcars, or similar techniques. In the United States, this "piggyback" technique involves removing the trailer from the tractor and loading onto a flatcar (by crane, or using a yard mule) and then securing the trailer to a 5th wheel hitch attachment. The tractor portion is generally not loaded. Most references show a 5th wheel hitch attachment mechanism.

Other techniques have been tried, including using the trailers themselves as railcars, either with attached railroad trucks (which proved to be too heavy) or by attaching the trailers to railroad trucks. With the advent of containerized transport (Intermodal) these sorts of techniques seem to have fallen by the wayside. Indeed, even traditional "piggyback" freight services seem to have given way to containerized (Intermodal) cargo.

There are a number of wheel strapping and chocking devices known in the art, as illustrated in the following references. A number of references show various means of attaching vehicle wheels to flatcars or car carriers or trailers. Most of these use straps or chocks or a combination of both, to secure the tire portion to the carrier.

Anderson et al., U.S. Pat. No. 8,272,818, issued Sep. 25, 2013, discloses an auto-rack railroad car vehicle wheel chock. Autorack rail cars are commonly used to transport new automobiles. The invention discloses a wheel chock for securing a vehicle in a grill-like track.

Coslovi et al., U.S. Pat. No. 6,666,148, issued Dec. 23, 2003, discloses a vehicle carrying railroad car structure. This is one of a number of references directed toward "piggyback" style rail transport, where trailers are placed on a flatcar and secured using a pop-up 5th wheel hitch. Coslovi is silent as to what, if anything, secures the wheels in his design.

Minakami et al., U.S. Pat. No. 6,095,731, issued Aug. 1, 2000, discloses a wheel fixing apparatus. This reference is representative of a number of wheel (or more accurately, tire) strapping and chocking devices, which are manually applied to vehicle wheels.

Collins, U.S. Pat. No. 5,795,115, issued Aug. 18, 1998, discloses an apparatus for loading a vehicle to a trailer. Collins attaches a device to the hub of the car, which in turn, engages a bracket on the trailer. This is one of the few devices that actually engages the wheel (or part of the wheel) and not the tire of the vehicle. Even so, this reference requires a device be attached to the vehicle wheel hub.

Engle, U.S. Pat. No. 5,501,566, issued Mach 26, 1996, discloses a system for supporting trailers on railcars. Again, this is another example of a "Piggyback" type system. A truck (yard mule) drives the trailer onto the train, and a bracket on the truck engages a pop-up 5th wheel to latch onto the trailer, automatically.

Fity et al., U.S. Pat. No. 4,668,142, issued May 26, 1987, discloses a car-carrier with each wheel-train equipped with its own carrying cross-structures. Moveable wheel brackets engage the tires of the cars.

Willetts, U.S. Pat. No. 4,385,857, issued May 31, 1983, discloses an Intermodal transport system. See FIG. 2. This is part of a system, discussed above, that used train trucks to carry trailers modified to serve as railcars.

Shannon, U.S. Pat. No. 4,129,079, issued Dec. 12, 1978, discloses a railroad car for highway trailers. This system allows a yard mule to back a trailer onto the flatcar form the side, and then pivot the front of the trailer to latch the 5th wheel in place. While the device shows a mechanism for supporting the rear wheels of the trailer, it does not appear to latch or clamp the wheels in any way, but merely provide a chocking function.

Gutridge, U.S. Pat. No. 3,568,607, issued Mar. 9, 1971, discloses a railroad flatcar for transporting containers and highway trailers. It appears the trailers are secured only by the 5th wheel hitch.

Gwatkin, U.S. Pat. No. 2,036,212, issued Apr. 7, 1936, discloses a device for positioning a vehicle in a convenyance. Note the use of the U-shaped bracket to engage the tire of the car.

Kaushik, "Vert-A-Pac: An Unusual Way to Transport Automobiles" printed Mar. 16, 2014, discloses the vertical transport system used for the ill-fated Vega automobile.

All of the above references suffer from some drawbacks. The $5^{th}$-wheel carriers carry only trailers, and not the trucks themselves. The various wheel chocks, straps, and chains require manual installation or securing by a person in the railroad yard, which is costly, time-consuming, and dangerous.

Thus, it remains a requirement in the art to provide an automated means for securing a tractor trailer combination to a railroad car or the like, without the need for intervention by manual installation of securing devices or the like.

BRIEF SUMMARY OF THE INVENTION

The invention comprises an improved method and apparatus for securing a tractor-trailer or other powered vehicle to a flatbed railcar (flatcar). The vehicle is driven onto the flatcar until the powered wheels of the vehicle reach a set of rollers. The vehicle then drives these rollers (or a treadmill) which power a an electrical, mechanical, hydraulic, or pneumatic system which latches the wheels of the vehicle to the flatcar.

The latching system may engage the rim of the truck's driving wheels, preferably near the center portion. A tube-like device engages the wheel rim to clear the lug nuts and hub portion. A rubber or urethane gasket or cover over this device may be used to prevent marring of the wheel rim. The engaging portion may rotate at the same RPM as the wheel so there is no abrasion or rubbing or marring of the wheel. Once the truck's wheels are secured to the railroad flatbed, the driver may leave the truck and ride on a passenger rail car accompanying the train or ride the truck sleeper compartment. Alternatively, the driver may exit the vehicle and another driver will be assigned to pick up the vehicle at the terminus of the train journey. Although illustrated herein as engaging only the driving wheels of the truck, the device may be adapted to engage the trailer wheels as well as the steering wheels of the truck.

As the device is self-powered by the truck wheels, no separate power supply or power supply connection is required for powering the securing device. However, in an alternative embodiment, pneumatic pressure, electricity, or the like, provided from a shore connection or from a locomotive or onboard power supply may be used to drive the securing mechanism.

DETAILED DESCRIPTION OF THE INVENTION

Figure 1:
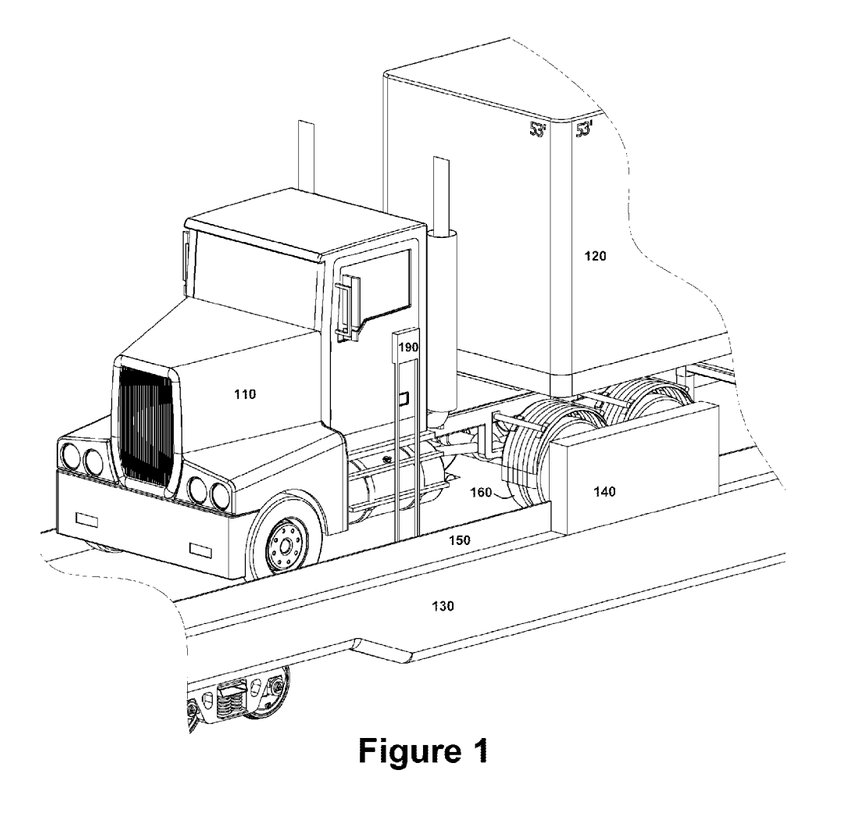
FIG. 1 is a perspective view of a tractor-trailer rig loaded onto a flatbed rail car in one embodiment of the present invention.
Figure 2:
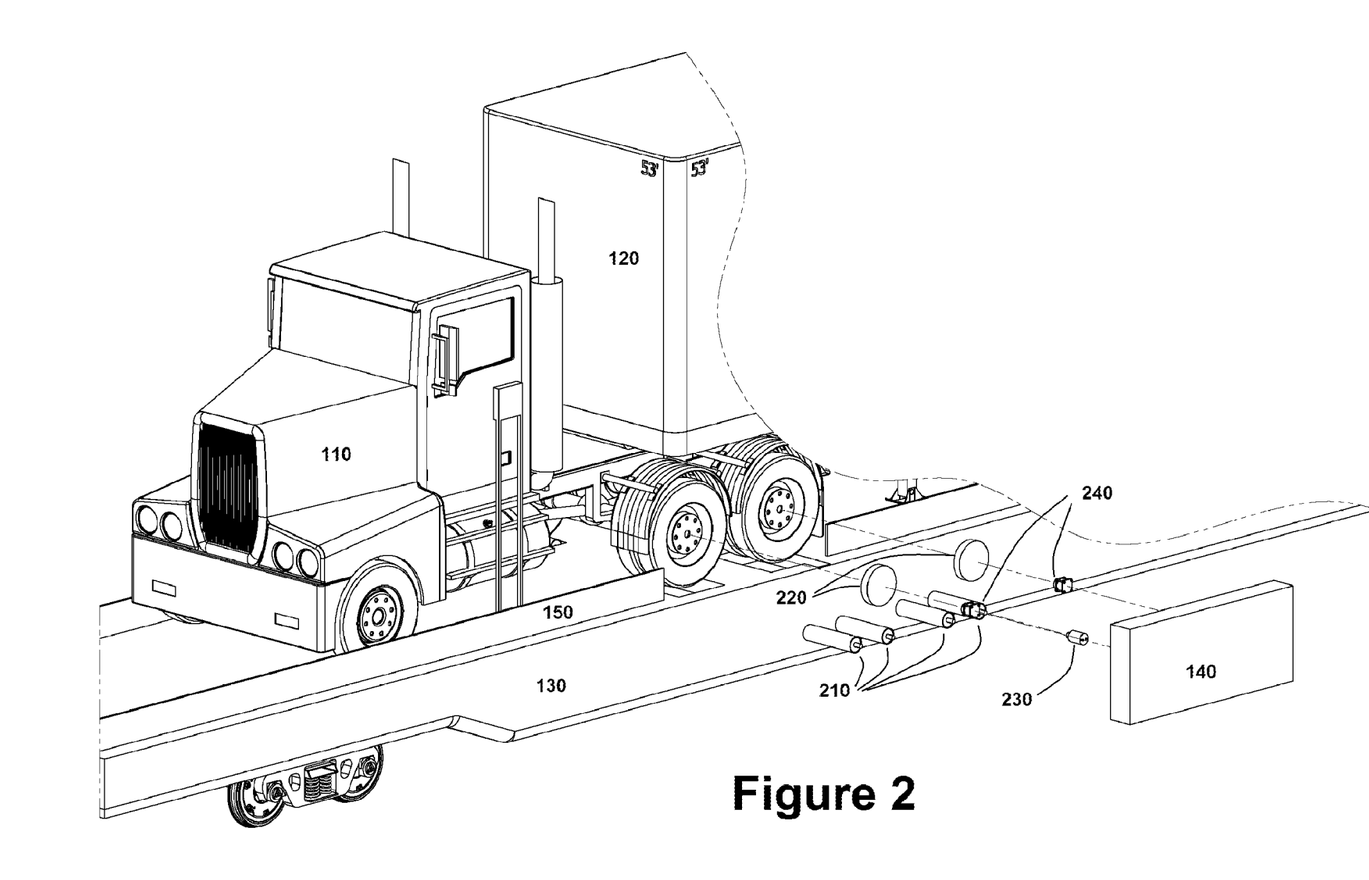
FIG. 2 is a perspective view of a tractor-trailer rig loaded onto a flatbed rail car in one embodiment of the present invention, showing the securing mechanism in exploded view.
Figure 4:
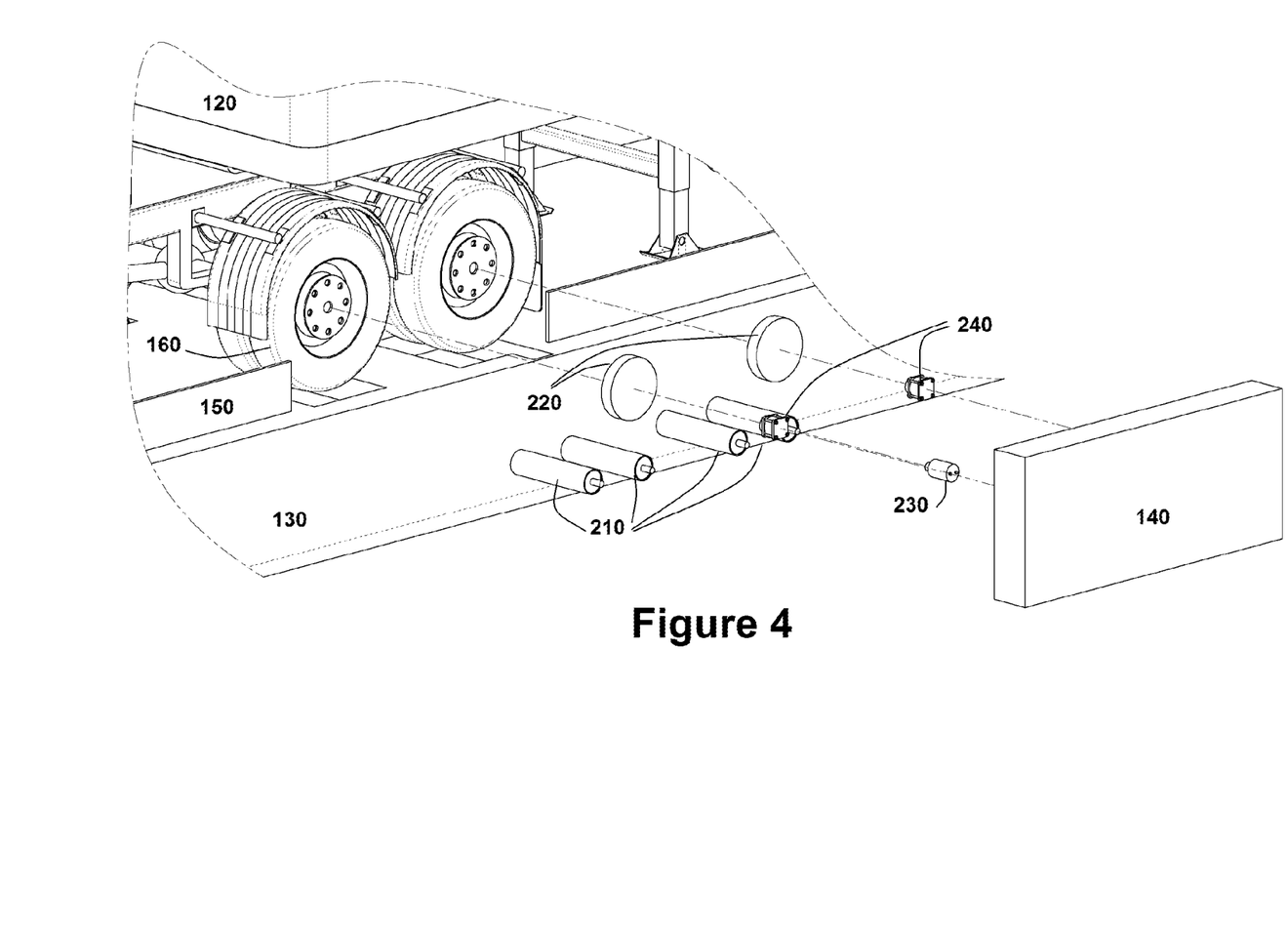
FIG. 4 is an enlarged perspective view of FIG. 2, illustrating a tractor-trailer rig loaded onto a flatbed rail car in one embodiment of the present invention, showing the securing mechanism in exploded view.
Figure 5:
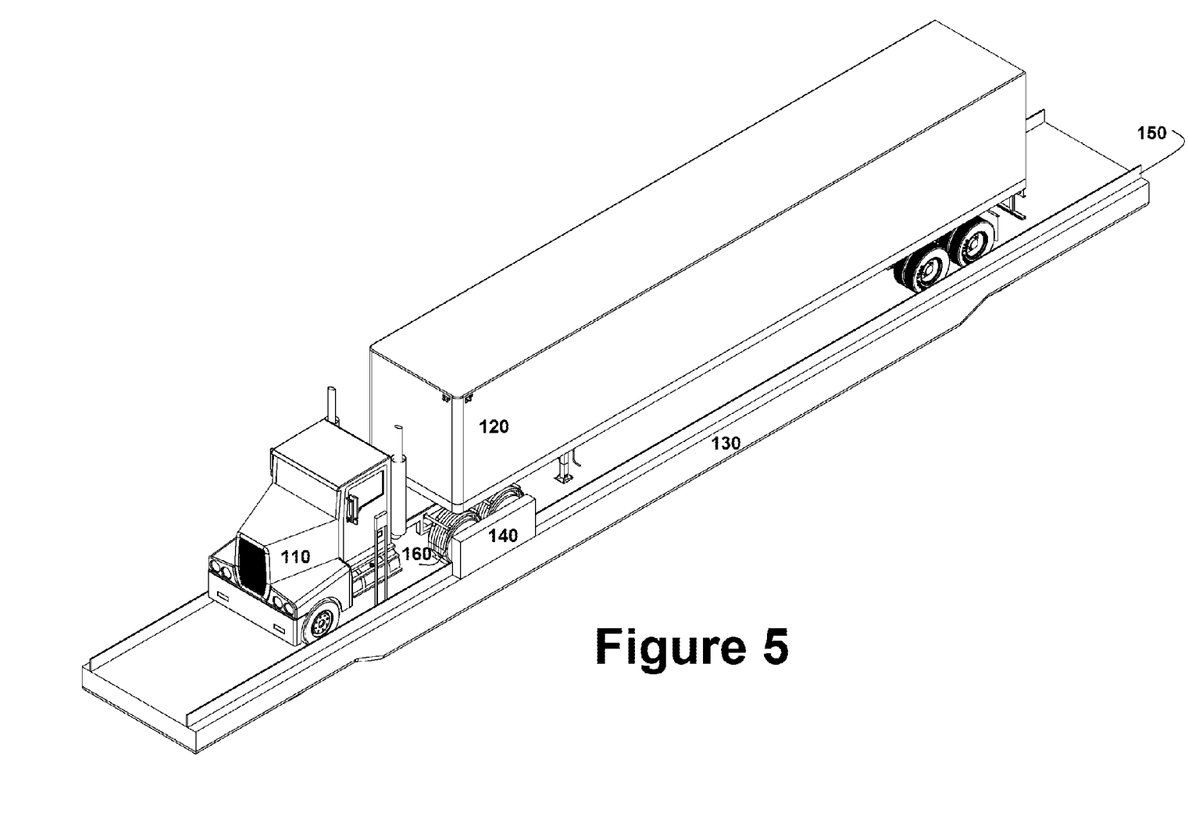
FIG. 5 is a perspective view of a tractor-trailer rig loaded onto a flatbed rail car in one embodiment of the present invention.
Figure 8:
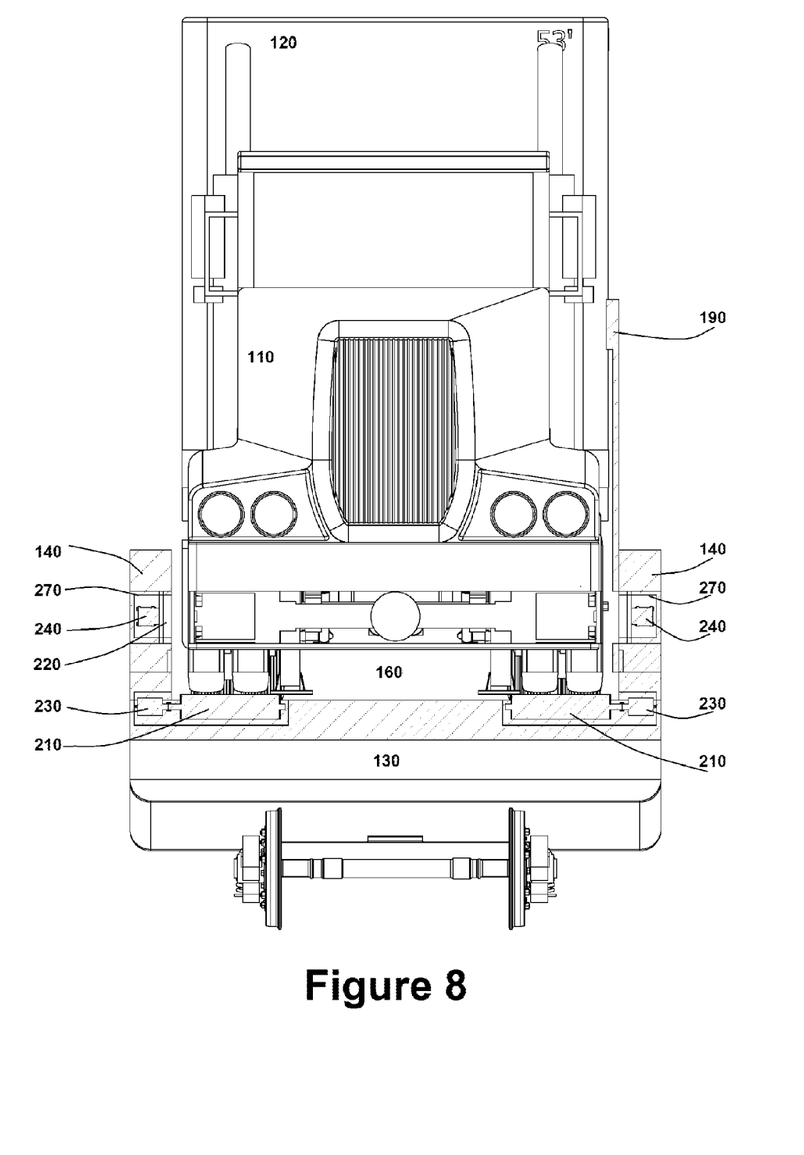
FIG. 8 is a frontal view of a tractor-trailer rig loaded onto a flatbed rail car in one embodiment of the present invention.

FIG. 1 is a perspective view of a tractor-trailer rig loaded onto a flatbed rail car in one embodiment of the present invention. FIG. 2 is a perspective view of a tractor-trailer rig loaded onto a flatbed rail car in one embodiment of the present invention, showing the securing mechanism in exploded view. FIG. 4 is an enlarged perspective view of FIG. 2, illustrating a tractor-trailer rig loaded onto a flatbed rail car in one embodiment of the present invention, showing the securing mechanism in exploded view. FIG. 5 is a perspective view of a tractor-trailer rig loaded onto a flatbed rail car in one embodiment of the present invention. FIG. 8 is a frontal view of a tractor-trailer rig loaded onto a flatbed rail car in one embodiment of the present invention.

Referring to FIGS. 1, 2, 4, 5, and 8, which provide an overview of the present invention, a tractor-trailer rig comprising a truck tractor 110 and a trailer 120 are shown on a flatbed railcar 130. Truck tractor 110 may have driving wheel assemblies 160 which may comprise a plurality of wheels with tires, mounted to hub assemblies to drive truck tractor 110 as is known in the art. Flatbed railcar 130 may be part of a train of such railcars, known as a "rolling road". Each car may be connected to the next car, and provided with intermediate ramps, which may be retracted automatically or manually, or may articulate with the train when it is in motion. At one end of such a train, a ramp or other loading platform is provided so that a driver may simply drive his truck onto the last flatcar and proceed forward on the train until he reaches the first available empty flatcar, and the as illustrated in FIG. 5. Guides 150 may be provided to guide the tractor trailer on the flatbed railcar 130.

Once on the flatcar, and the drive wheels 160 positioned on rollers 210 as illustrated in FIG. 1, the driver may utilize control panel 190 to activate securing mechanism 140. Control panel 190 may be pneumatic or electronic, depending on the type of drive mechanism used for securing mechanism 140. Control panel 190, if electric, may optionally obtain data from the driver as to the destination, loan, name, billing information, ticket information and the like, which may be communicated electronically (wirelessly) with a billing and ticketing system or the like.

Once the driver activates securing mechanism 140 via control panel 190, he may be prompted to place the truck tractor 110 in low gear and apply power to the drive wheels 160. Drive wheels 160 may then drive rollers 210 while truck tractor 110 remains stationary. Rollers 210 may drive a hydraulic pump, compressor, generator, or mechanical mechanism, represented as element 230, within securing mechanism 140, to engage driving wheels 160, preferably surrounding the center portion of the rim, to secure the tractor-trailer 110, 120, to railcar 130. Once the tractor-trailer 110, 120 is secured to railcar 130, an indicator (audio or visual) on control panel 190 may indicate such to the driver, who may then shut down truck tractor 110 and proceed to boarding the passenger portion of the train. Alternately, the driver may stay in the vehicle in the truck's sleeper cab. The driver may also leave the truck and another driver be assigned to drive the truck at the terminus of the train journey. If securing mechanism 140 is electric in nature, control panel 190 may signal via wireless connection or wired links, to a station or to the locomotive, that the truck tractor 110 has been secured to flatbed railcar 130.

In this manner, the tractor-trailer 110, 120 can be self-secured to the railcar by the driver, without the intervention or checking by railroad personnel. Rolling Road trains can be loaded more quickly—nearly as fast as drivers can drive their trucks aboard, and time and labor saved.

Figure 3:
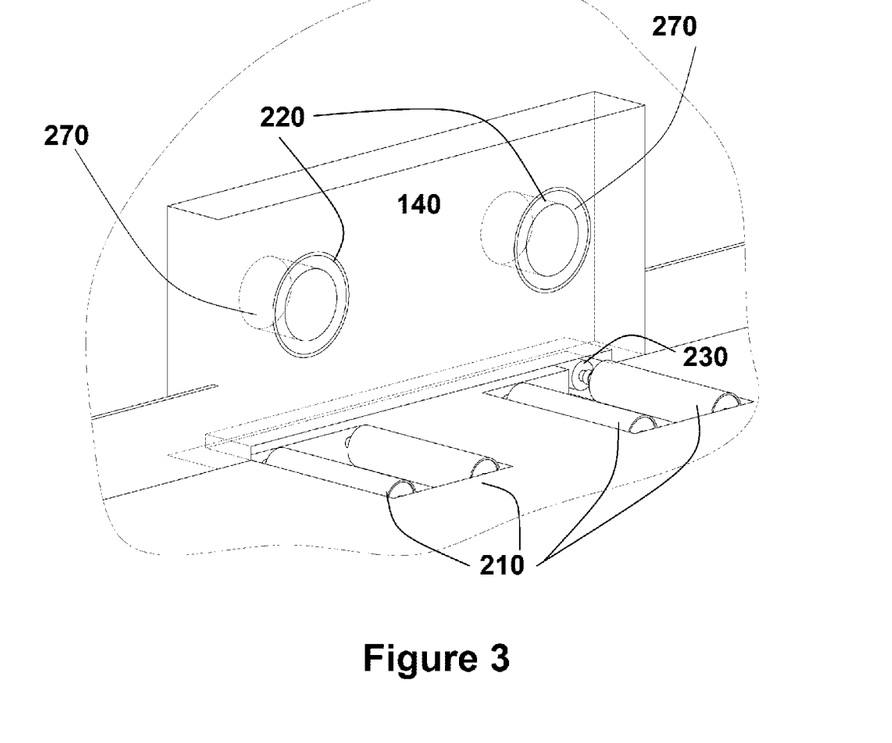
FIG. 3 is a perspective view of the securing mechanism in one embodiment of the present invention.
Figure 6:
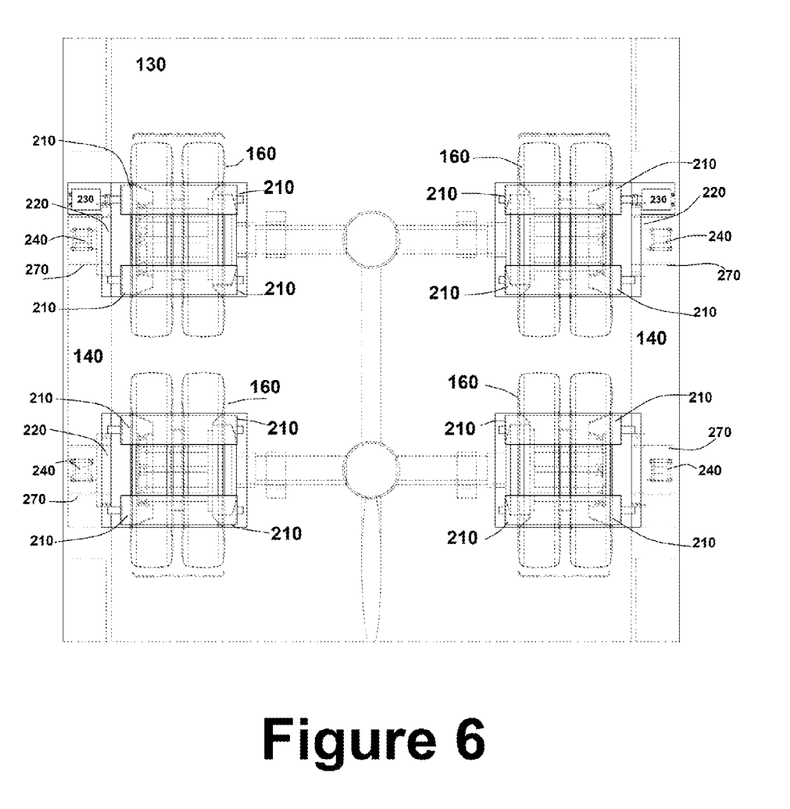
FIG. 6 is a cutaway top view of a tractor-trailer wheel set showing attachments to the securing mechanism in one embodiment of the present invention.

FIG. 3 is a perspective view of the securing mechanism in one embodiment of the present invention. FIG. 4 is an enlarged perspective view of FIG. 2, illustrating a tractor-trailer rig loaded onto a flatbed rail car in one embodiment of the present invention, showing the securing mechanism in exploded view. FIG. 6 is a cutaway top view of a tractor-trailer wheel set showing attachments to the securing mechanism in one embodiment of the present invention. Referring to FIGS. 3, 4, and 6, rollers 210 are spaced apart a predetermined distance such that they engage the drive wheels 160 of a tractor trailer. Rollers 210 freely rotate, allowing a truck tractor to remain stationary while the drive wheels are turning. Rollers 210 are coupled to securing mechanism 140 via a coupling to a generator, pneumatic compressor, hydraulic pump, or a mechanical mechanism (gears, belts, pulleys or the like) represented by element 230 so as to cause engagement mechanism 220 to extend toward a center portion of the truck wheels 160, when rollers 210 are rotated.

Figure 7:
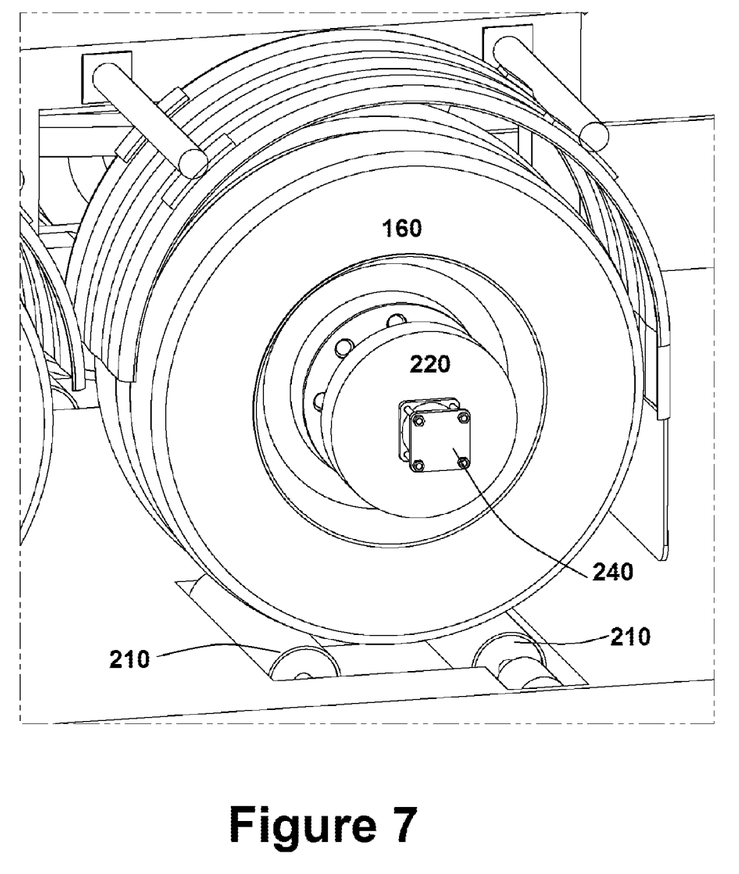
FIG. 7 is a perspective view of a tractor-trailer wheel, showing a wheel securing device on a wheel.

FIG. 7 is a perspective view of a tractor-trailer wheel, showing a wheel-securing device 220 on a wheel 160. Wheel securing device 220 is coupled to the securing mechanism via rotary coupling 240, to allow wheel-securing device 220 to rotate with wheel 160 as it spins on rollers 210. Wheel-securing device 220 may comprise a tubular structure, which grips the center portion of wheel 160 by pressing against it. Preferably, the interior surface of securing device 220 may be shaped to surround a standard tractor-trailer hub and lug nuts and thus engage it more securely. A rubber or urethane cover may be used on securing device 220 to prevent the marring or scratching of polished wheels.

Other types of securing devices may be utilized within the spirit and scope of the present invention. A wheel perimeter engaging device may be used to engage the outside rim of the vehicle or the tire, however this may be less desirable. Once the wheel 160 is secured by securing device 220, the driver may be instructed to shut down his truck via control panel 190, and rollers 210 may be locked into place to further prevent movement of the truck.

In a hydraulic or pneumatic embodiment, wheel securing device 220 may be driven from securing mechanism via a hydraulic or pneumatic cylinder represented by element 270, so as to drive securing device 220 toward wheel 160. When a predetermined pressure is reached, the device may then lock into that position, and signal the driver that the truck is secure. For an electrical embodiment, a linear actuator, screw jack, or the like 270 may be utilized in a similar manner. A mechanical embodiment may utilize a screw jack driven by rollers 210, using an over-running clutch to limit pressure on wheels 160.

While the preferred embodiment and various alternative embodiments of the invention have been disclosed and described in detail herein, it may be apparent to those skilled in the art that various changes in form and detail may be made therein without departing from the spirit and scope thereof.

I claim:

1. A system for securing a tractor trailer to a railroad flatcar, comprising:
   a railroad flatcar having a substantially flat portion for supporting a tractor-trailer and a guided track for guiding wheels of the tractor-trailer when driven onto the railroad flatcar;
   at least one of a pair of rollers and a treadmill, located on the substantially flat portion of the railroad flatcar, engaging at least one drive wheel of the tractor-trailer;
   at least one of a hydraulic pump, pneumatic pump, electrical generator, and mechanical linkage, coupled to the at least one of a pair of rollers and a treadmill, respectively generating hydraulic pressure, pneumatic pressure, electrical energy, and mechanical energy; and
   a wheel latching mechanism, coupled to the at least one of a hydraulic pump, pneumatic pump, electrical generator, and mechanical linkage, latching at least one wheel of the tractor-trailer,
   wherein when the at least one of a pair of rollers and a treadmill is driven by the at least one drive wheel of the tractor-trailer, the wheel latching mechanism is driven to engage at least one wheel of the tractor-trailer to secure the tractor trailer to the railroad flatcar.

2. The system of claim 1, wherein the wheel latching mechanism comprises a hub latching mechanism, extending from a raised side portion of the railroad flatcar, and engaging a hub of a least one wheel of the tractor-trailer when the at least one of a pair of rollers and a treadmill is driven by the at least one drive wheel of the tractor-trailer.

3. The system of claim 2, further comprising a control panel, mounted to the railroad flatcar, displaying information to a driver of the tractor-trailer and indicating to the driver when to engage the at least one drive wheel of the tractor trailer to drive the at least one of a pair of rollers and a treadmill, and indicating when the hub latching mechanism has engaged the hub of at least one wheel of the tractor-trailer.

4. The system of claim 1, further comprising a control panel, mounted to the railroad flatcar, displaying information to a driver of the tractor-trailer and indicating to the driver when to engage the at least one drive wheel of the tractor trailer to drive the at least one of a pair of rollers and a treadmill, and indicating when the wheel latching mechanism has engaged at least one wheel of the tractor-trailer.

5. The system of claim 2, wherein the hub latching mechanism further comprises at least one of a pneumatic motor, hydraulic motor, electric motor, and mechanical linkage, coupled to a corresponding one of the at least one of a hydraulic pump, pneumatic pump, electrical generator, and mechanical linkage, to rotate the hub latching mechanism to match speed of the at least one drive wheel of the tractor-trailer.

6. A method for securing a tractor trailer to a railroad flatcar, comprising the steps of:
 driving a tractor-trailer onto a railroad flatcar having a substantially flat portion for supporting the tractor-trailer and a guided track for guiding wheels of the tractor-trailer when driven onto the railroad flatcar;
 engaging at least one drive wheel of the tractor-trailer to at least one of a pair of rollers and a treadmill, located on the substantially flat portion of the railroad flatcar;
 generating at least one of hydraulic pressure, pneumatic pressure, electrical energy, and mechanical energy from a corresponding at least one of a hydraulic pump, pneumatic pump, electrical generator, and mechanical linkage, coupled to the at least one of a pair of rollers and a treadmill;
 latching at least one wheel of the tractor-trailer with a wheel latching mechanism, coupled to the at least one of a hydraulic pump, pneumatic pump, electrical generator, and mechanical linkage;
 wherein when the at least one of a pair of rollers and a treadmill is driven by the at least one drive wheel of the tractor-trailer, the wheel latching mechanism is driven to engage at least one wheel of the tractor-trailer to secure the tractor trailer to the railroad flatcar.

7. The method of claim 6, wherein the wheel latching mechanism comprises a hub latching mechanism, extending from a raised side portion of the railroad flatcar, and the step of latching at least one wheel of the tractor-trailer comprises engaging a hub of at least one wheel of the tractor-trailer with the hub latching mechanism when the at least one of a pair of rollers and a treadmill is driven by the at least one drive wheel of the tractor-trailer.

8. The method of claim 7, further the step of indicating to the driver when to engage the at least one drive wheel of the tractor trailer to drive the at least one of a pair of rollers and a treadmill, and indicating when the hub latching mechanism has engaged the hub of at least one wheel of the tractor-trailer, with a control panel, mounted to the railroad flatcar, displaying information to a driver of the tractor-trailer.

9. The method of claim 6, further the step of indicating to the driver when to engage the at least one drive wheel of the tractor trailer to drive the at least one of a pair of rollers and a treadmill, and indicating when a hub latching mechanism has engaged a hub of at least one wheel of the tractor-trailer, with a control panel, mounted to the railroad flatcar, displaying information to a driver of the tractor-trailer.

10. The method of claim 7, wherein the step of latching at least one wheel of the tractor-trailer comprises the step of rotating the hub latching mechanism to match speed of the at least one drive wheel of the tractor-trailer using at least one of a pneumatic motor, hydraulic motor, electric motor, and mechanical linkage, coupled to a corresponding one of the at least one of a hydraulic pump, pneumatic pump, electrical generator, and mechanical linkage.

* * * * *